(12) United States Patent
Smith et al.

(10) Patent No.: US 8,051,328 B1
(45) Date of Patent: Nov. 1, 2011

(54) RECOVERING FROM A SYSTEM FAILURE

(75) Inventors: Randall Smith, Sunnyvale, CA (US);
Stanley Luke, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 12/836,725

(22) Filed: Jul. 15, 2010

Related U.S. Application Data

(63) Continuation of application No. 11/781,819, filed on Jul. 23, 2007, now Pat. No. 7,774,646.

(51) Int. Cl.
*G06F 11/00* (2006.01)
(52) U.S. Cl. ............................................. 714/15; 714/16
(58) Field of Classification Search .................. None
See application file for complete search history.

(56) References Cited

U.S. PATENT DOCUMENTS

| | | | |
|---|---|---|---|
| 4,814,971 A * | 3/1989 | Thatte ........................... | 714/15 |
| 4,878,167 A * | 10/1989 | Kapulka et al. ................. | 714/16 |
| 5,465,328 A | 11/1995 | Dievendorff et al. | |
| 5,790,775 A | 8/1998 | Marks et al. | |
| 5,944,838 A | 8/1999 | Jantz | |
| 6,192,365 B1 | 2/2001 | Draper et al. | |
| 6,567,928 B1 * | 5/2003 | Lyle et al. ........................ | 714/15 |
| 6,578,160 B1 | 6/2003 | MacHardy et al. | |
| 6,978,398 B2 | 12/2005 | Harper et al. | |
| 7,082,446 B1 | 7/2006 | Bottomley | |
| 7,111,189 B1 | 9/2006 | Sicola et al. | |
| 7,685,378 B2 | 3/2010 | Arakawa et al. | |
| 2001/0047495 A1 * | 11/2001 | Kettley et al. ..................... | 714/2 |
| 2006/0010180 A1 * | 1/2006 | Kawamura et al. ........... | 707/204 |
| 2007/0180302 A1 | 8/2007 | Allen et al. | |

OTHER PUBLICATIONS

Notice of Allowance in related U.S. Appl. No. 11/781,819 dated Apr. 6, 2010.

* cited by examiner

*Primary Examiner* — Gabriel Chu
(74) *Attorney, Agent, or Firm* — Cooper Legal Group, LLC

(57) ABSTRACT

On or more techniques and/or systems are provided for rapidly resuming processing of client requests after a system failure event. Accordingly, during a boot-up process, a storage system, upon detecting a system failure event of the storage system, conditions its system memory to reflect a state of the system memory at a time of the failure by processing client requests or commands stored in a non-volatile operations log. The storage system can resume processing client requests after processing the operations in the nonvolatile operations log and prior to flushing data to storage devices.

20 Claims, 8 Drawing Sheets

RECOVERING FROM A SYSTEM FAILURE

FIELD

The subject matter herein generally relates to data storage systems. More specifically, the subject matter herein relates to a data storage system rapidly recovering after a system failure, and resuming processing of client-initiated requests.

CROSS-REFERENCE TO RELATED CASE

This application is related to co-pending U.S. patent application Ser. No. 11/781,819, entitled "SURVIVING STORAGE SYSTEM TAKEOVER BY REPLAYING OPERATIONS IN AN OPERATIONS LOG MIRROR," filed on Jul. 23, 2007.

BACKGROUND

In order to strike a proper balance between performance, reliability, and cost, some disk-based data storage systems temporarily read data from and write data to system memory (e.g., volatile randomly accessible memory), prior to writing data to disk storage. Because system memory is volatile, to prevent data loss in the case of a system failure, non-volatile memory is utilized to store a log of all operations that have been written into system memory, but not yet written to disk storage. Accordingly, the performance increase realized from utilizing system memory for temporarily reading and writing data is achieved without negatively impacting the reliability of the data storage system.

FIG. 1 illustrates an example of a network-attached storage system 10 configured to operate as described above. The storage system 10 provides a high-availability data storage service to one or more clients, such as client 12, over a network 14. As illustrated in FIG. 1, the storage system 10 comprises a system memory 16 and a non-volatile memory with an operations log, such as NVLOG 18. In addition, the storage system 12 is connected to a group of storage devices 20 (e.g., disk drives or disk shelves).

When the storage system 10 receives a write command from the client 12, the storage system 10 logs a write operation in NVLOG 18 and then writes the data to system memory 16 on behalf of the client. If a subsequent client-initiated read command is received at the storage system 10, the storage system 10 reads the data from system memory, or from the storage devices 20, depending on whether the data are in system memory or the storage devices 20. When the system memory 16 reaches some predetermined capacity, or the operations log 18 reaches some predetermined capacity, data previously written to system memory 16 can be written to disk storage 20 and the corresponding operations can be cleared from the operations log, thereby freeing system memory 16 and the operations log 18 for processing new read/write commands.

In the event of a system failure (e.g., such as a power failure), data stored in volatile system memory 16 may be lost. To ensure that the data are not permanently lost, a recovery process can be executed. FIG. 2 illustrates an example of a current recovery process executed during a boot-up routine. For example, referring to FIG. 2, at method operation 22 a recovery process can be initiated during a boot-up procedure (e.g., reboot of the failed system). Generally, the recovery process may be initiated during a first boot-up sequence after the system failure event to mitigate a client attempting to access data stored in system memory and potentially lost during the system failure event. Until the boot-up sequence has completed and the file system has been initialized, client-initiated requests directed to the storage devices 20 of the storage system 10 are not processed. This procedure prevents a client from reading incorrect data, before such data has been returned to its proper state by the recovery routine.

At operation 24, the operations that were previously recorded in the operations log, such as NVLOG 18, of the non-volatile memory are "replayed". That is, for example, respective operations stored in the operations log are processed to condition the state of the system memory 16 as it was when the failure event occurred. At method operation 26, the system memory (e.g., or the relevant portion thereof) can be flushed (e.g., written) to the storage devices 20 of the storage system 10. At operation 28, the storage system 10 begins processing new client-initiated requests directed to the storage devices 20 of the storage system 10.

As illustrated in FIG. 2 by the dash outlined box with reference number 30, one problem with this approach is that the storage system 10 may not be able to process client-initiated requests during the time that the operations in the operations log are being replayed (e.g., method operation 24) and system memory is being flushed to disk (e.g., method operation 26). Some client applications may be very sensitive to delays and a timeout error during a data storage operation (e.g., a client-initiated read/write operation) may lead the client to fail or malfunction in some manner. Other client applications, for example, such as a stock exchange trading or quotation application, are extremely time sensitive and data storage operations in this example typically have a low latency in order for the application to function properly. Therefore, decreasing a time that the data storage system is unable to process client-initiated requests is desirable.

When two storage systems are configured in a cluster such that one serves as a back-up to the other in the case of a system failure event, a similar problem occurs during the takeover procedure that is initiated after the system failure event. In general, a takeover procedure comprises a surviving storage system (e.g., non-failed) preparing to process client-initiated requests on behalf of a failed storage system. When a takeover procedure takes longer than desired, clients may experience delays and/or timeouts, thereby causing the clients to fail or malfunction in some manner, for example. An example of this problem is illustrated in FIGS. 3 through 5.

FIG. 3 illustrates an example of two data storage systems (e.g., storage system A and storage system B) configured in a cluster such that either system can serve as a back-up system to the other in the event one system fails. For example, during a normal operating mode, respective data storage systems A and B operate independently of each other. In the normal operating mode, storage system A can provide clients with access to storage devices A, and storage system B can provide clients access to storage devices B. Further, for example, storage system A is said to "own" storage devices A, while storage system B "owns" storage devices B.

However, when a system failure occurs at either storage system, a takeover routine can be initiated by the surviving storage system to facilitate clients continuing to access data stored on the data storage devices of the failed storage system. Accordingly, as illustrated in FIG. 3, storage system A is coupled not only to storage devices A, but also to storage devices B. Similarly, storage system B is coupled to both storage devices A and storage devices B. Furthermore, respective storage systems A and B comprise an interconnect adapter (not shown) by which they may be connected to one another via an interconnect cable, for example.

Referring again to FIG. 3, respective storage systems are shown to comprise system memory (e.g., system memory A and B). Further, respective storage systems A and B comprise a non-volatile memory (e.g., NVLOG A and NVLOG B) where an operations log and log mirror may be stored. For example, storage system A can comprise NVLOG A, which may be partitioned to comprise a first portion (e.g., operations log A) for storing operations directed to storage system A, and a second portion (e.g., operations log mirror (B)) for storing operations directed to storage system B. In this example, when a client directs a write command to storage system A, an operation is logged in operations log A of NVLOG A, and the associated data is written to system memory A, where it is stored until a later time when the data is flushed to storage devices A. Additionally, in this example, the operation can be mirrored to operations log mirror (A) of NVLOG B, thereby allowing storage system B to replicate a state of storage system A's system memory (e.g., system memory A), if necessary, during a takeover routine.

Referring now to FIG. 4, one embodiment of storage systems A and B are illustrated where storage system A has experienced a system failure. In this embodiment, storage system B may be referred to as the surviving storage system, while storage system A may be referred to as the failed storage system. When storage system B detects that storage system A has failed, storage system B can initiate a takeover procedure so that storage system B can continue providing clients with access to the data on storage devices A.

FIG. 5 illustrates a current method for performing such a takeover routine associated with a system failure event at one system in a cluster configuration. At method operation 50, data storage system B detects a system failure event at data storage system A. In one embodiment, the system failure event may be detected by B, or alternatively, storage system A may notify storage system B of the system failure event. In any case, after the system failure event, client-initiated requests directed to storage devices A of storage system A can be redirected to, and received at, surviving storage system B. In this example, storage system B, however, may not be able to begin processing client-initiated requests directed to storage devices A until storage system B completes a takeover procedure and initializes a file system of storage devices A. In particular, for example, storage system B can update its system memory to reflect the state of storage system A's system memory at a time storage system A failed. In this example, this can mitigate a client-initiated request directed to data that was stored in storage system A's system memory at the time of the system failure event from being processed with incorrect data from storage devices A.

In this embodiment, to update its system memory, at operation 52, the surviving storage system B "replays" operations stored in the operations log mirror (A) of NVLOG B, thereby writing into system memory B the data contents that were in storage system A's system memory (e.g., system memory A) at the time storage system A failed. At operation 54, the data stored in system memory B (or the relevant portion thereof) are flushed to storage devices A. In one example, the relevant portion of system memory B may comprise the portion of system memory B storing the data generated by replaying the operations log mirror (A). After the operations log mirror (A) has been replayed, and the system memory flushed to storage devices A, storage system B can resume processing new client-initiated requests directed to the storage devices of the failed storage system (e.g., storage devices A of storage system A) at operation 56. In many current or prior systems, after the takeover routine has executed, there is a presumption that the storage system has been reset, for example, back to a clean state. That is, for example, there is a presumption that after the takeover routine, the operations log is empty or free, and that all client data have been committed to storage devices.

As with the recovery procedure described above in connection with FIGS. 1 and 2, the takeover procedure creates a situation in which client-initiated requests are subject to timeout. For example, the dash outlined box with reference number 58 in FIG. 5 indicates time during which the surviving storage system A may not process client-initiated requests. Specifically, storage system B may not process client-initiated requests during a time that the operations in the operations log mirror (A) are being replayed (e.g., method operation 52) and system memory B is being flushed to storage devices A (e.g., method operation 54). Therefore, for example, decreasing the time that the data storage system is unable to process client-initiated requests during a takeover procedure is desirable.

SUMMARY

Aspects of the present disclosure propose to provide for client initiated requests to be processed during a storage system failure event recovery process, where the requests can be processed earlier (e.g., faster) than current or previous techniques and systems, by utilizing an unused portion of an operations log stored in system memory.

Consistent with one embodiment, and described herein, is a method by which a storage system is booted-up after a failure event of storage system. Accordingly, during the boot-up procedure, and upon detecting a previous system failure of the storage system, operations in a non-volatile operations log (e.g., logged operations prior to the failure) can be processed, or "replayed." Processing these operations can place the system memory of the storage system in a state that is consistent with the state of the system memory at a time of the system failure event. After processing the operations in the non-volatile operations log mirror, but before data in the system memory is flushed to storage devices of the storage system, the storage system can resume processing client-initiated requests (e.g., new requests) directed to the storage devices of the storage system.

Consistent with an alternative embodiment, a storage system rapidly resumes processing client requests after performing a recovery routine during a boot-up procedure. Accordingly, during the boot-up procedure the storage system determines whether a system failure event caused the system to previously shut down. If so, the storage system performs additional operations during the boot-up sequence to recover data that may have been lost during the system failure event. In particular, the storage system processes operations in a non-volatile operations log. By processing the operations in the non-volatile operations log, the storage system places its system memory in a state consistent with the state of the system memory at the time the system failure occurred. Consequently, the storage system can resume processing client-initiated requests—using the unused portion of the operations log to log new client requests—prior to flushing data from its system memory to its storage devices.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

The accompanying drawings, which are incorporated in and constitute a part of this specification, illustrate one or more implementations and, together with the description, serve to explain at least some of the advantages and principles of the subject matter herein.

DETAILED DESCRIPTION

Figure 1:
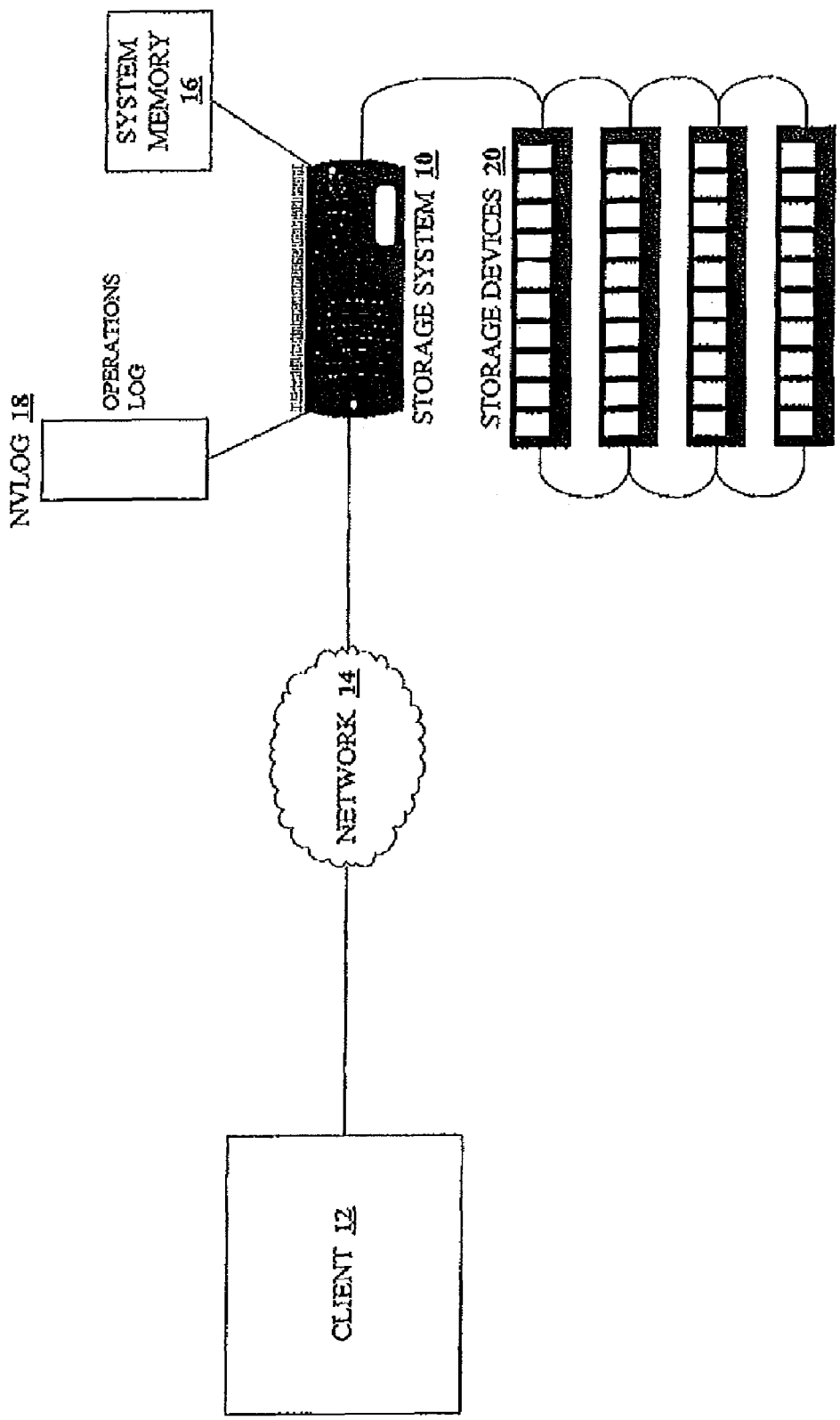
FIG. 1 illustrates a standalone storage system configured to provide a data storage service to a client over a network, consistent with the disclosure herein.
Figure 2:
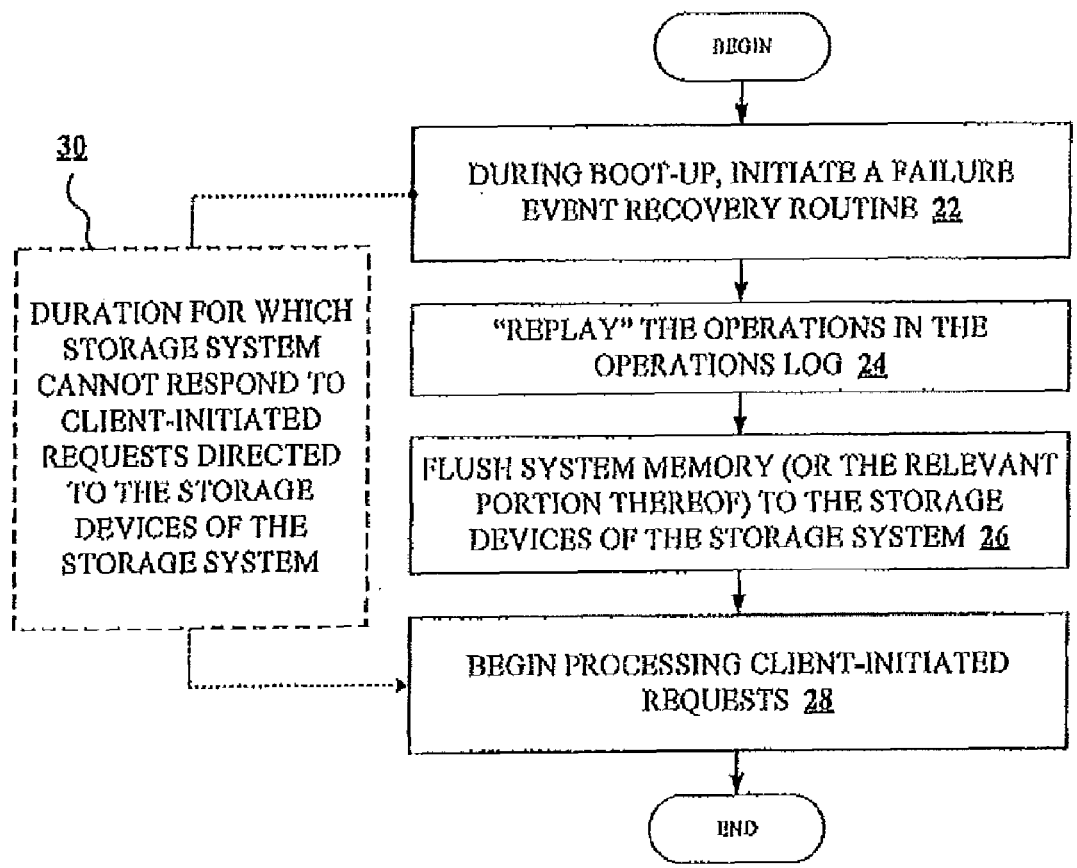
FIG. 2 illustrates a prior art method by which a data storage system recovers from a failure event.

In the context of a standalone storage system, one embodiment provides a method by which the storage system rapidly resumes processing client-initiated requests after a system failure. For example, during the first boot-up sequence after a system failure, the storage system will recover data potentially lost during the system failure by "replaying" operations stored in a non-volatile operations log, thereby placing the system memory of the storage system in the same condition as it was in when the system failure occurred. Once the state of the system memory has been updated to reflect the state of the system memory at the time of the system failure, the storage system resumes processing client-initiated requests. According to prior art recovery methods, client-initiated requests are processed only after the operations log has been replayed and the system memory has been flushed to the storage devices of the storage system. Advantageously, a storage system consistent with one embodiment decreases the amount of time during which the storage system is unable to process client-initiated requests by using the unused portion of operations log mirror to process client-initiated requests prior to flushing data to storage devices.

In the context of two storage systems in a clustered configuration such that either system can serve as a back-up system to the other in the event one system fails, one embodiment provides a takeover method by which the surviving storage system rapidly resumes processing client-initiated requests directed to the storage devices of the failed storage system. According to an embodiment, after a first storage system has failed and during the takeover procedure by the surviving storage system, the surviving storage system "replays" an operations log mirror thereby conditioning the system memory of the surviving storage system to reflect the state of the system memory of the failed storage system at the time of the system failure event. Once the operations log mirror has been replayed at the surviving storage system, and the system memory of the surviving storage system has been updated, the surviving storage system resumes processing client-initiated requests directed to the storage devices of the failed storage system.

In contrast to prior art takeover methods, after replaying the operations log mirror, the surviving storage system does not flush data stored in its system memory to the storage devices of the failed storage system before it resumes processing client-initiated requests directed to the storage devices of the failed storage system. Instead, after the operations stored in the operations log mirror have been replayed, the surviving storage system immediately resumes processing client-initiated requests directed to the storage devices of the failed storage system. As client-initiated requests are processed, the surviving storage system utilizes the portion of the surviving storage system's non-volatile log dedicated to the operations log mirror as a regular operations log. That is, the operations log mirror is used to log new operations as they are processed. When the log reaches a predetermined capacity, or when system memory reaches a predetermined capacity, the relevant portion of the surviving storage system's system memory is flushed to the proper storage devices, and the portion of the non-volatile memory that was previously dedicated for use as an operations log mirror is cleared for continued use as an operations log. Other aspects are described below in connection with the description of the figures.

Reference will now be made in detail to one or more implementations consistent with the illustrations in the accompanying drawings. Wherever possible, the same reference numbers will be used throughout the drawings and the following description to refer to the same or like parts. Although discussed with reference to these illustrations, the claimed subject matter is not limited to the implementations illustrated therein. Hence, the reader should regard these illustrations merely as examples.

Figure 6:
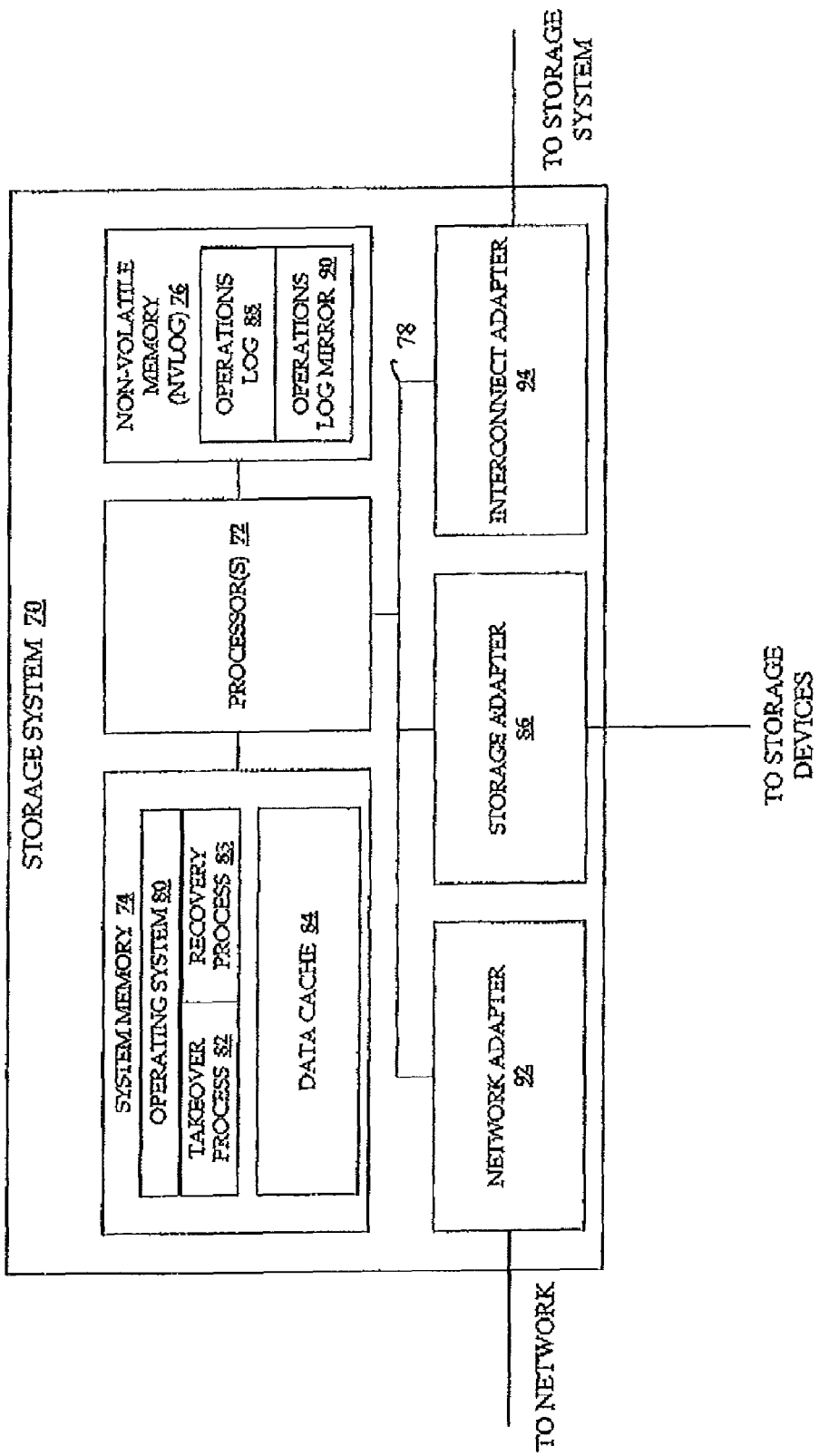
FIG. 6 illustrates a logical block diagram of a storage system, consistent with the disclosure herein.

FIG. 6 illustrates a logical block diagram of a storage system 70 configured to operate in a failover cluster, according to one embodiment. Certain standard and well-known components which are not necessary for understanding may not be shown. Although the storage system illustrated in FIG. 6 is meant to be representative of a typical storage system, in one particular embodiment, the storage system (sometimes referred to as a "filer") is consistent with storage systems designed by Network Appliance, Inc. of Sunnyvale, Calif.

As illustrated in FIG. 6, the storage system 70 includes one or more processors 72 coupled to system memory 74 as well as a non-volatile memory 76 by means of a bus system 78. The bus system 78 shown in FIG. 6 is an abstraction that represents any one or more separate physical buses and/or point-to-point connections, connected by appropriate bridges, adapters and/or controllers. The bus system 78, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 72 are the central processing units (CPUs) of the storage system 70 and, thus, execute instructions and control the overall operation of the storage system 72. In certain embodiments, the processor(s) 72 accomplish this by executing software instructions (e.g., applications or procedures) stored in system memory 74. The processor(s) 72 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The system memory 74 is or includes the main memory of the storage system 70. The system memory 74 represents any form of random access memory (RAM), read-only memory (ROM), flash memory, or the like, or a combination of such devices. The system memory 74 stores, among other things, the operating system 80 of the storage system 70, in which the takeover process 82 introduced above can be implemented. In addition, the system memory 74 temporarily stores client generated data in a data cache 84, prior to writing the data to an appropriate storage device via the storage system's storage adapter 86. The system memory 74 is generally a volatile memory device, which loses its data contents when not provided with power.

In addition to the system memory 74, the storage system 70 includes a non-volatile memory 76. In contrast to the system memory 74, the non-volatile memory 76 maintains its data contents in the absence of power. Accordingly, the non-volatile memory 76 includes an operations log for storing client-initiated requests that have been committed to the data cache 84 of the system memory 74, but not yet flushed (e.g., written) to the appropriate storage device. In addition, the non-volatile memory 76 includes an operations log mirror 90 for storing operations that have been committed to the system memory of a partner storage system, but not yet committed to the storage devices of the partner storage system. Accordingly, if a failure event (e.g., a power failure) occurs at the storage system, the operations log 88 of the non-volatile memory 76 can be used to recover any lost client data that was stored in the data cache 84 of the system memory 74 and not yet written to the appropriate storage devices at the time of the failure. Similarly, if the partner storage system fails, the storage system can process the operations in the operations log mirror to recover any data that was lost in the system memory of the partner storage system during the system failure event.

Also connected to the processor(s) 72 through the bus system 78 are one or more internal mass storage devices (not shown), a storage adapter 86, a network adapter 92, and an interconnect adapter 94. The internal mass storage device may be or include any conventional medium for storing large volumes of data in a non-volatile manner, such as one or more magnetic or optical based disks. The storage adapter 86 allows the storage system 70 to access the storage devices of the storage subsystem and may be, for example, a Fibre Channel adapter or a SCSI adapter. The network adapter 92 provides the storage system 70 with the ability to communicate with remote devices, such as clients, over a network and may be, for example, an Ethernet adapter.

When configured in a cluster to provide failover protection and operate in conjunction with a partner storage system, the interconnect adapter 94 of the storage system 70 is a mechanism by which the storage system 70 communicates directly with its partner storage system. For instance, log data may be communicated (e.g., mirrored) to the partner storage system via the interconnect adapter 94. Similarly, each storage system in the cluster may communicate a heartbeat signal periodically to indicate to its partner that it is operating in a normal state. In an alternative embodiment, the network adapter may serve as the mechanism by which two storage systems communicate with one another. For instance, each storage system may be configured to communicate (e.g., mirror) operations to the other via the network adapter.

In one embodiment, the operating system 80 of the storage system is a version of the Data ONTAP® operating system available from Network Appliance of Sunnyvale, Calif. Accordingly, the storage system may operate with a write anywhere file layout (WAFL®) file system. Accordingly, the storage system 70 logically organizes data (e.g., files) into a hierarchical structure, and stores the data as blocks on disks.

Figure 7:
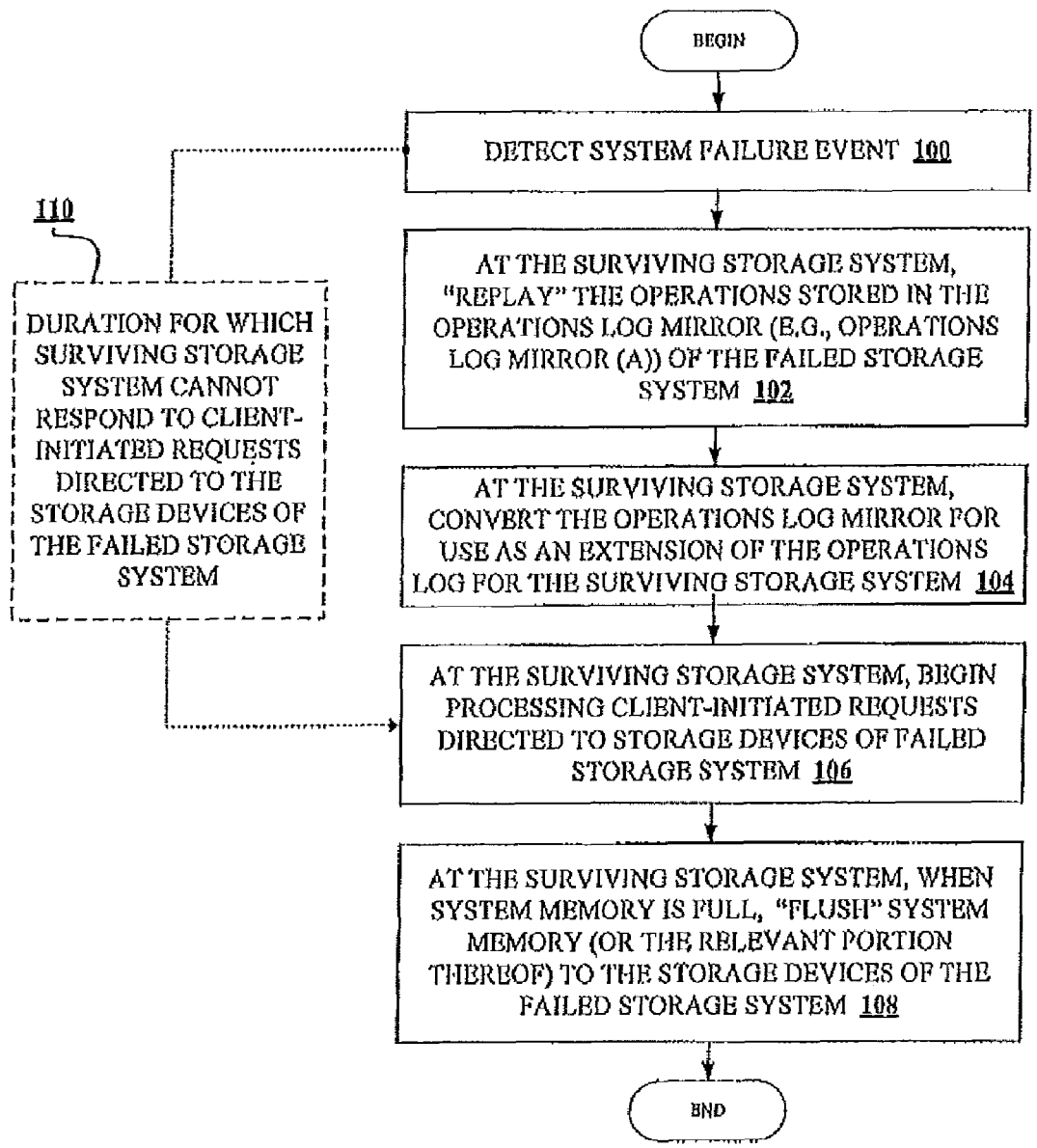
FIG. 7 illustrates a method, consistent with the disclosure herein, by which a surviving storage system takes over for a failed storage system in the case a system failure event occurs.

FIG. 7 illustrates a method, according to an embodiment, by which a storage system performs a takeover process in response to a system failure event. At operation 100 a system failure event is detected. In general, a system failure event is any error or system failure that prevents a data storage system from operating in a normal state and/or reliably servicing client-initiated requests. By way of example, a system failure event may be caused by a storage system losing power (e.g., a power failure), a disk failure (e.g., a mechanical failure), or a network failure that isolates a storage system. In any case, at operation 100, a system failure event is detected.

Figure 3:
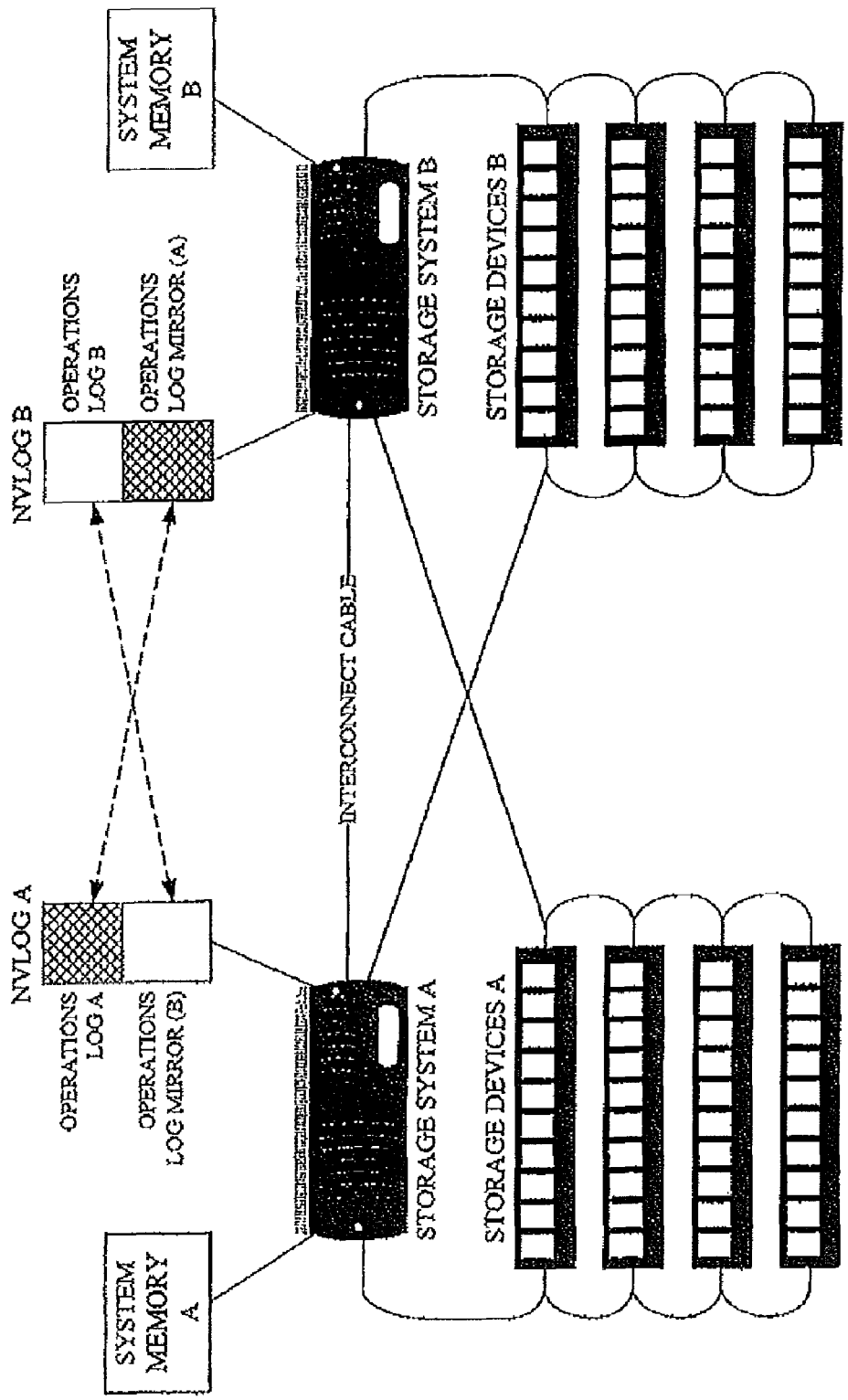
FIG. 3 illustrates two data storage systems in a cluster configuration, consistent with the disclosure herein, such that either system can serve as a back-up system to the other if one system fails.

The manner in which a storage system determines that a system failure event has occurred may vary and depend upon the particular configuration of the storage systems. For example, in one embodiment, the storage systems may periodically communicate a "heart beat" signal to one another over a direct communication channel, such as the interconnect cable connecting the two storage systems as illustrated in FIG. 3. So long as a storage system receives the "heart beat" signal from its partner system as expected, each storage system operates in a normal state. However, the absence of such a signal may indicate that a system failure event has occurred at the partner storage system. Alternatively, one storage system may directly communicate a message to the other storage system to indicate that a system failure event has occurred. For example, in one embodiment, after a storage system detects its own system failure event, that storage system may communicate a message over a network connection, or an interconnect cable, to its partner storage system, indicating that a system failure event has occurred. In yet another embodiment, a storage location on a shared disk may be configured as a "mailbox" such that, one storage system can write a message to the mailbox to inform the other storage system of a system failure event. Accordingly, each storage system may be configured to periodically read from the designated storage location to determine if a message has been written by a partner storage system.

Regardless of the particular manner or method used to inform the surviving storage system of the system failure event, because of the system failure event, the surviving storage system receives client-initiated requests that would otherwise have been directed to the failed storage system. However, before servicing any such requests, the surviving storage system must recover any data that may have been in the failed storage system's system memory at the time of the system failure, and therefore may have been lost.

Figure 4:
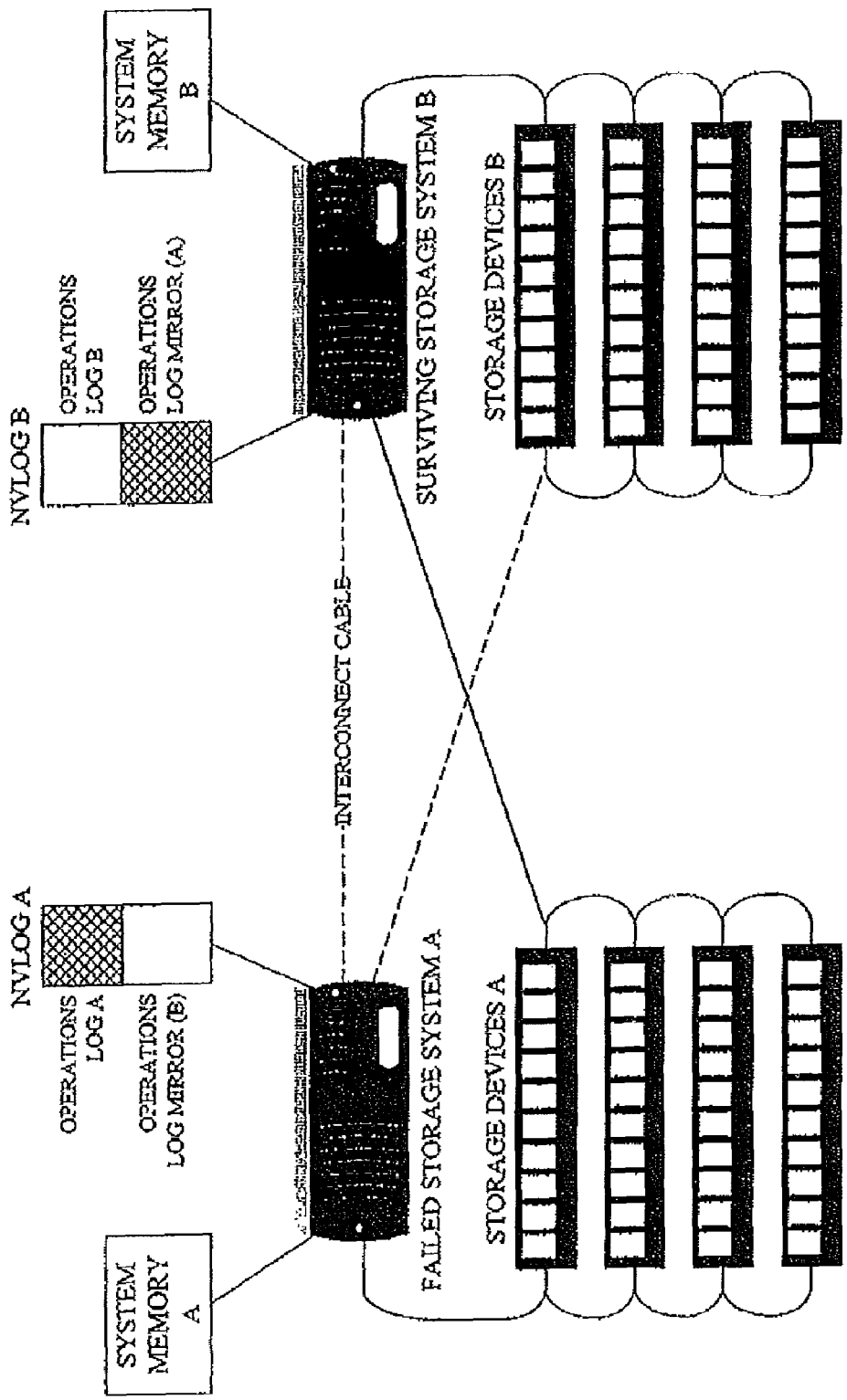
FIG. 4 illustrates two data storage systems (as shown in FIG. 3) after a first system has failed.
Figure 5:
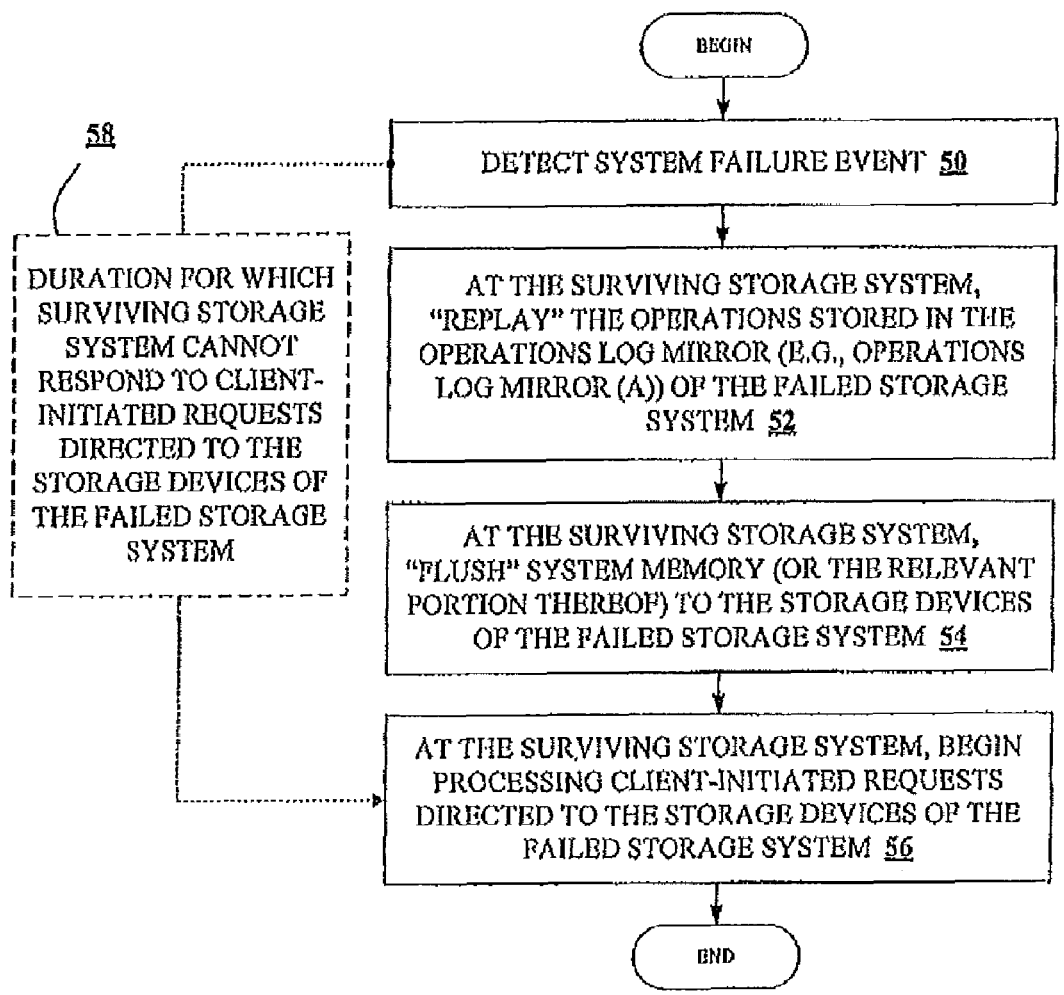
FIG. 5 illustrates a prior art method by which a surviving storage system takes over for a failed storage system in the case when a system failure event occurs.

Accordingly, at operation 102, the surviving storage system "replays" the operations stored in the operations log mirror of its non-volatile memory (e.g., operations log mirror A in NVLOG B in FIG. 4). For example, the surviving storage system processes the operations that are stored in the operations log mirror, thereby conditioning the system memory (e.g., system memory B in FIG. 4) of the surviving storage system to reflect the state of the system memory (e.g., system memory A) of the failed storage system at the time of the system failure event. In this context, conditioning the system memory simply means to place the system memory in a state equivalent to the state the system memory was in at the time of the system failure event by writing data to the system memory in accordance with the instructions processed during the replay of the operations log mirror.

Next, at operation 104, the surviving storage system prepares the unused portion of the operations log mirror for use as an operations log for the surviving storage system. For instance, the portion of the non-volatile memory that is dedicated to the operations log mirror will generally have an unused or free portion. That unused portion of the operations log mirror is converted for use as an operations log for the surviving storage system. As the surviving storage system receives new client-initiated requests directed to the storage devices of the surviving storage system, or the storage devices of the failed storage system, the surviving storage system is able to log the operations to the unused portion of the operations log mirror which has been converted for use as a regular operations log.

At operation 106, the storage system begins processing client-initiated requests directed to the storage devices of the failed storage system. Because the operations log mirror has been replayed, and the system memory of the surviving storage system is now in a state consistent with the state of the system memory of the failed storage system, the surviving storage system can resume processing client-initiated requests. If a client-initiated read request is directed to data stored in system memory, the storage system simply reads the data from its system memory. However, if a client-initiated read request is directed to data stored in a storage device of the failed storage system, the surviving storage system reads the data from the storage devices of the failed storage system. In any case, during the takeover process, the surviving storage system is able to resume processing client-initiated requests much sooner than it would have, had it waited to begin processing of requests until it flushed data generated by replaying the operations log mirror to the storage devices of the failed storage system.

At operation 108, when the system memory (e.g., the data cache) becomes full, the contents of system memory are "flushed" (e.g., written) to the appropriate storage devices. Alternatively, the surviving storage system may flush the contents of system memory to the appropriate storage devices when the system memory reaches a predetermined capacity (e.g., prior to becoming full), or upon the occurrence of some other predetermined event, or at some other predetermined point in time. For example, the surviving storage system may flush the contents of system memory to the appropriate storage devices when the operations log (e.g., the previously unused portion of the operations log mirror) reaches a predetermined capacity, such as a certain percentage (e.g., 50%) of its full capacity. In general, the predetermined capacity of the system memory or operations log, at which point a flushing operation occurs, is determined so as to avoid a situation where the system memory, or the operations log, fills completely, thereby preventing the storage system from processing new incoming client-initiated requests. Therefore, by setting the threshold for triggering a flushing operation at some predetermined capacity (less than full capacity), the storage system is able to ensure clients stable storage. In any case, as data in the system memory are flushed to the appropriate storage devices, the associated logged operations are cleared from the corresponding log in the non-volatile memory, thereby freeing space in the log where new operations can be logged. Accordingly, when the system memory is flushed to disk, the entire portion of the non-volatile memory that was previously dedicated for use as an operations log mirror is made available to the surviving storage system for use as an operations log.

Advantageously, a takeover process or method enables the storage system to rapidly resume the processing of client-initiated requests directed to the storage devices of the failed storage system. For instance, as illustrated by the dash outlined box with reference number 110 in FIG. 7, the surviving storage system is prevented from processing client-initiated requests directed to the storage devices of the failed storage system for only so long as is needed to replay the operations in the operations log mirror (e.g., method operation 102) and convert the unused portion of the operations log mirror for use as an operations log (e.g., method operation 104). Because neither of these processing operations (e.g., method operations 102 and 104) involves writing data to the storage devices, the processing operations can be completed rapidly with limited delay in processing client-initiated requests.

Figure 8:
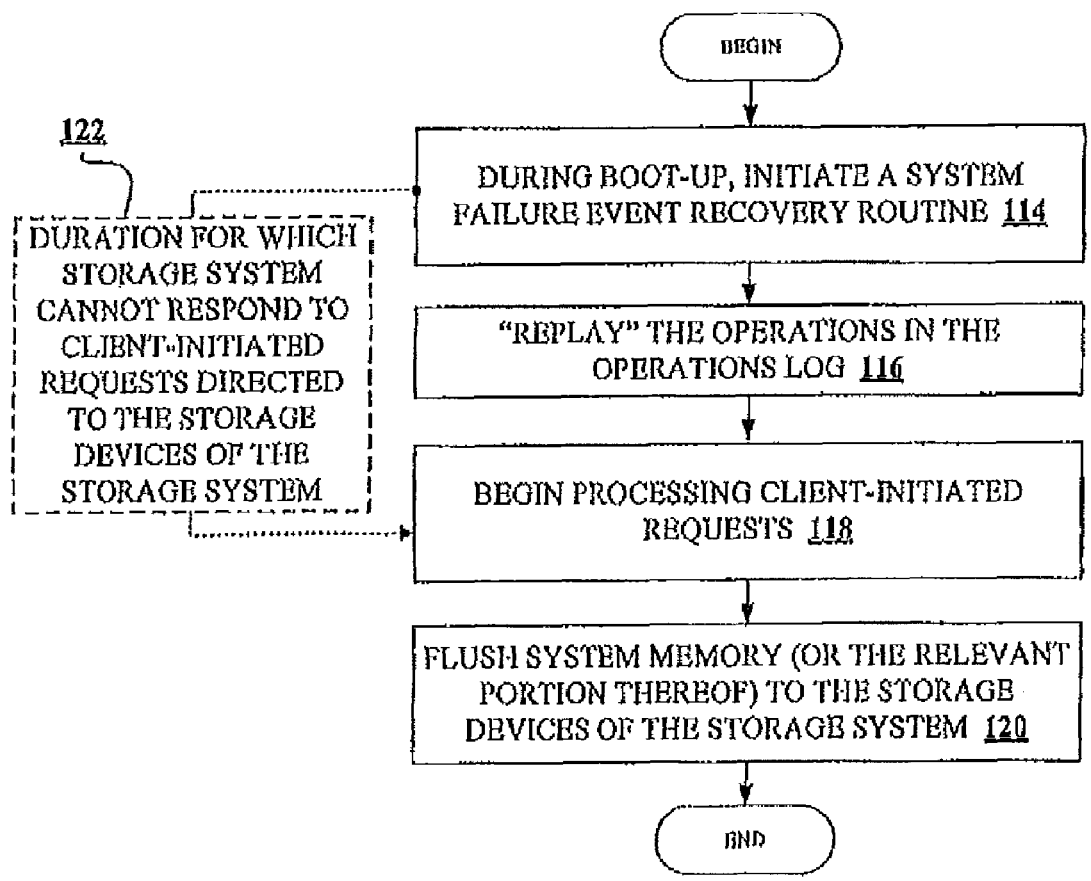
FIG. 8 illustrates a method, consistent with the disclosure herein, by which a data storage system recovers from a failure event.

FIG. 8 illustrates a method, according to one embodiment, by which a standalone storage system performs a recovery process in response to a failure event. Similar to the method described in connection with FIG. 7, the method of FIG. 8 enables a storage system to rapidly resume processing client-initiated requests after a system failure event.

At operation 114, during the boot-up procedure, a storage system initiates a recovery routine in response to a previous failure event. Because of the previous failure event, client generated data stored in the volatile system memory may have been lost. Therefore, the recovery routine is executed to recover any such data, by processing any operations that were logged in an operations log of the non-volatile memory. Until the operations log has been processed, the storage system is unable to process client requests.

At operations 116, the operations in the operations log (e.g., operations log of NVLOG 18 in FIG. 1) are "replayed", thereby conditioning the system memory of the storage system to the state that it was in when the failure event initially occurred. Next, at operation 118, the storage system resumes processing client-initiated requests, logging newly processed operations to the unused portion of the operations log. At operation 120, the storage system flushes data from system memory to the appropriate storage devices, thereby freeing space in the operations log so that new operations can be processed into memory and logged.

Advantageously and in contrast to prior art recovery methods, data generated during method operation 116 (e.g., replaying the operations log) are not flushed to storage devices prior to resuming the processing of client-initiated requests. Consequently, the storage system can rapidly enter a normal operating state and resume processing client requests during the boot-up sequence. As illustrated by the dash outlined box with reference number 122, the storage system is only unavailable to process client requests so long as is necessary to replay the operations in the operations log (e.g., method operation 116).

In one embodiment, the methods described herein may be embodied as a sequence or series of instructions stored on a computer- or machine-readable medium. While the machine-readable medium may be a single medium, the term "machine-readable medium" should be taken to include a single medium or multiple media (e.g., memory or storage components) that store the one or more sets of instructions. The term "machine-readable medium" shall also be taken to include any medium that is capable of storing, encoding or carrying a set of instructions for execution by the machine and that cause the machine to perform any one or more of the methodologies discussed herein. The term "machine-readable medium" shall accordingly be taken to include, but not be limited to, solid-state memories, optical and magnetic media, and carrier wave signals. Finally, the illustrative method operations, which may be performed by a computer-implemented program (e.g., instructions), may be executed simultaneously, or in a different order than described above, and additional processing steps may be incorporated. Furthermore, various aspects may be implemented in hardware, software, or a combination thereof.

The foregoing description of various implementations has been presented for purposes of illustration and description. It is not exhaustive and does not limit the claimed subject matter to the precise form or forms disclosed. Furthermore, it will be appreciated by those skilled in the art that the instant disclo-

What is claimed is:

1. A method for a storage system to resume processing client-initiated requests after a system failure, comprising:
during a boot-up procedure, upon detecting a previous system failure, processing operations in a non-volatile operations log so as to place system memory of the storage system in a state consistent with a system memory state at a time the system failure occurred;
after processing the operations in the non-volatile operations log, processing client-initiated requests prior to flushing data in the system memory to storage devices of the storage system, the processing client-initiated requests comprising utilizing an unused portion of the non-volatile operations log to log newly processed client-initiated requests; and
flushing data stored in the system memory of the storage system to storage devices of the storage system when the non-volatile operations log fills to a predetermined capacity.

2. The method of claim 1, processing client-initiated requests comprising processing new client-initiated requests utilizing system memory.

3. The method of claim 1, comprising converting the unused portion of the non-volatile operations log for use as a new client-initiated request operations log.

4. The method of claim 3, comprising:
using the new client-initiated request operations log to log newly processed client-initiated requests.

5. The method of claim 1, comprising flushing data stored in the system memory of the storage system to storage devices of the storage system when the system memory fills to a predetermined capacity.

6. The method of claim 1, comprising, after flushing the data in the system memory to the storage devices of the storage system, using a portion of non-volatile memory that was previously dedicated for use as the non-volatile operations log as an operations log for newly processed client-initiated requests.

7. The method of claim 1, processing operations in a non-volatile operations log so as to place system memory of the storage system in a state consistent with the state of the system memory at the time the system failure occurred comprising writing data to the system memory, where the written data reflects a most recent state of a file system maintained by the storage system.

8. The method of claim 1, comprising, during a first boot-up procedure after a system failure, detecting the previous system failure.

9. A storage system comprising:
a recovery component configured to, upon a boot sequence after a system failure:
process operations in a non-volatile operations log so as to place system memory of the storage system in a state consistent with a system memory state at a time the system failure occurred; and
after the operations in the non-volatile operations log are processed, process client-initiated requests prior to flushing data in the system memory to one or more storage devices of the storage system, processing client-initiated requests comprising utilizing an unused portion of the non-volatile operations log to log newly processed client-initiated requests; and
a data flushing component configured to:
flush data stored in the system memory of the storage system to one or more storage devices of the storage system when the non-volatile operations log fills to a predetermined capacity, at least some at least one of the recovery component and the data flushing component implemented at least in part via a processor.

10. The storage system of claim 9, comprising a non-volatile memory component comprising the non-volatile operations log.

11. The storage system of claim 9, the boot sequence after a system failure comprising a first boot sequence after the system failure.

12. The storage system of claim 9, comprising a network adapter component communicatively coupled to a client from which the storage system receives client-initiated requests to be stored in the non-volatile operations log, where the received client-initiated requests are initially received, logged, and processed by a system memory component associated with the storage system, prior to being flushed to a storage device of the storage system.

13. The storage system of claim 9, comprising a storage adapter communicatively coupled to one or more storage devices, where the storage devices store data associated with the client-initiated requests.

14. The storage system of claim 9, the data flushing component configured to:
flush data stored in the system memory to storage devices communicatively coupled with the storage system when the system memory fills to a predetermined capacity.

15. The storage system of claim 9, comprising an operation log conversion component configured to convert the unused portion of the non-volatile operations log for logging the newly processed client-initiated requests.

16. The storage system of claim 15, the operation log conversion component configured to, after flushing data in the system memory to the storage devices, convert the operations log.

17. A tangible computer readable storage medium comprising computer executable instructions that when executed by a microprocessor of a computing system perform a method comprising:
during a boot-up procedure, upon detecting a previous system failure, processing operations in a non-volatile operations log so as to place system memory of the storage system in a state consistent with a system memory state at a time the system failure occurred;
after processing the operations in the non-volatile operations log, processing client-initiated requests prior to flushing data in the system memory to storage devices of the storage system, the processing client-initiated requests comprising utilizing an unused portion of the non-volatile operations log to log newly processed client-initiated requests; and
flushing data stored in the system memory of the storage system to storage devices of the storage system when the non-volatile operations log fills to a predetermined capacity.

18. The computer readable storage medium of claim 17, the method comprising converting the unused portion of the non-volatile operations log for use as a new client-initiated request operations log.

19. The computer readable storage medium of claim 17, the method comprising flushing data stored in the system memory of the storage system to storage devices of the storage system when
the system memory fills to a predetermined capacity.

20. The computer readable storage medium of claim 17, the method comprising using a portion of non-volatile memory that was previously dedicated for use as the non-volatile operations log as an operations log for newly processed client-initiated requests, after flushing the data in the system memory to the storage devices of the storage system.

* * * * *